(12) United States Patent
Misawa

(10) Patent No.: US 8,405,734 B2
(45) Date of Patent: Mar. 26, 2013

(54) IMAGE CAPTURING APPARATUS, IMAGE CAPTURING METHOD AND PROGRAM FOR THE IMAGE CAPTURING APPARATUS

(75) Inventor: Atsushi Misawa, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 149 days.

(21) Appl. No.: 13/089,800

(22) Filed: Apr. 19, 2011

(65) Prior Publication Data

US 2011/0193981 A1    Aug. 11, 2011

Related U.S. Application Data

(62) Division of application No. 11/478,653, filed on Jul. 3, 2006, now Pat. No. 7,990,423.

(30) Foreign Application Priority Data

Aug. 12, 2005    (JP) .................................. 2005-234174

(51) Int. Cl.
*H04N 5/76* (2006.01)
*H04N 5/91* (2006.01)
*H04N 5/77* (2006.01)

(52) U.S. Cl. .................. 348/220.1; 348/231.1; 348/262; 386/225

(58) Field of Classification Search ............... 348/220.1, 348/231.1, 262; 386/225
See application file for complete search history.

(56) References Cited

U.S. PATENT DOCUMENTS

| | | | |
|---|---|---|---|
| 5,473,441 A | 12/1995 | Inuiya et al. | |
| 6,961,083 B2 * | 11/2005 | Obrador et al. | 348/220.1 |
| 7,110,025 B1 | 9/2006 | Loui et al. | |
| 2001/0033331 A1 | 10/2001 | Eto et al. | |
| 2002/0012051 A1 | 1/2002 | Mizoguchi | |
| 2002/0197067 A1 | 12/2002 | Ohnishi | |
| 2003/0090571 A1 | 5/2003 | Scheurich | |
| 2004/0189823 A1 | 9/2004 | Shibutani | |

FOREIGN PATENT DOCUMENTS

| | | |
|---|---|---|
| JP | 5-347731 A | 12/1993 |
| JP | 2001-69442 A | 3/2001 |
| JP | 2001-111934 A | 4/2001 |
| JP | 2003-219341 A | 7/2003 |
| JP | 2003-274246 A | 9/2003 |
| JP | 2004-304425 A | 10/2004 |

* cited by examiner

*Primary Examiner* — Roberto Velez
*Assistant Examiner* — Joel Fosselman
(74) *Attorney, Agent, or Firm* — Birch, Stewart, Kolasch & Birch, LLP

(57) ABSTRACT

An image capturing apparatus being capable of generating a frame for a moving image at a desired timing using a still image captured during capturing a moving image is provided. The image capturing apparatus according to the present invention includes: a still image capturing instruction reception section for receiving an instruction to capture a still image when a plurality of frame images are continuously captured; a still image capturing control section for causing the image capturing section to capture the still image instead of one frame image when the still image capturing instruction reception section receives the instruction to capture the still image; a still image capturing timing recording section for recording a still image capturing timing at which the still image is captured; frame image before/after image-capturing extracting section for extracting a frame image before image-capturing and a frame image after image-capturing captured respectively before/after the still image capturing timing; and a frame image generating section for generating an alternate frame image substituted for the frame image which could not be captured because the image capturing section captures the still image based on the frame image before image-capturing and the frame image after image-capturing.

8 Claims, 9 Drawing Sheets

290

| IMAGE ID | IMAGE DATA |
|---|---|
| ⋮ | ⋮ |
| #10331 | FRAME IMAGE 10331 |
| #10332 | FRAME IMAGE 10332 |
| #10333 | ALTERNATE FRAME IMAGE 10333 |
| #10334 | FRAME IMAGE 10334 |
| ⋮ | ⋮ |
| #20333 | STILL IMAGE 20333 |
| ⋮ | ⋮ |

282

| TIMING ID | IMAGE ID |
|---|---|
| ⋮ | ⋮ |
| #331 | #10331 |
| #332 | #10332 |
| #334 | #10334 |
| ⋮ | ⋮ |

280

| TIMING ID | IMAGE ID |
|---|---|
| ⋮ | ⋮ |
| #333 | #20333 |
| ⋮ | ⋮ |

*FIG. 4*

IMAGE CAPTURING APPARATUS, IMAGE CAPTURING METHOD AND PROGRAM FOR THE IMAGE CAPTURING APPARATUS

CROSS REFERENCE TO RELATED APPLICATION

This application is a Divisional of U.S. application Ser. No. 11/478,653, filed on Jul. 3, 2006 now U.S. Pat. No. 7,990,423, which claims the benefit of Japanese Application No. 2005-234174, filed on Aug. 12, 2005, both of which are hereby incorporated by reference in their entireties.

BACKGROUND OF THE INVENTION

1. Field of the Invention

The present invention relates to an image capturing apparatus, an image capturing method, and a program for the image capturing apparatus. Particularly, the present invention relates to an image capturing apparatus, an image capturing method for capturing a moving image and a still image, and a program for the image capturing apparatus.

2. Related Art

Conventionally, a movie still camera being capable of obtaining a moving image without dropping frames even if a still image is captured during recording the moving image is disclosed, for example, in Japanese Patent Application Publication No. 2003-219341. The movie still camera can acquire moving image data having 640 pixels in the horizontal direction by 480 pixels in the vertical direction per frame at a constant frequency. Then, when a release button is pushed during recording the moving data, still image data having 1280 pixels in the horizontal direction by 960 pixels in the vertical direction is acquired and recorded on a memory card. At this time, a reduced image of which size is the same as that of one frame image for the moving image is generated from the still image data and inserted into a position at which the still image is acquired.

However, such an above-described conventional movie still camera records the reduced image generated from a still image and the still image are recorded on the memory card. Therefore, the capacity of the memory card is fully occupied if a number of still images are captured.

SUMMARY OF THE INVENTION

Thus, it is an object of the present invention to provide an image capturing apparatus, an image capturing method and a program for the image capturing apparatus which are capable of solving the problem accompanying the conventional art. The above and other objects can be achieved by combining the features recited in independent claims. Then, dependent claims define further effective specific example of the present invention.

A first aspect of the present invention provides a image capturing apparatus. The image capturing apparatus includes: an image capturing section; a moving image capturing control section for causing the image capturing section to capture a moving image including a plurality of frame images; a still image instruction reception section for receiving an instruction to capture a still image when the image capturing section continuously captures the plurality of fume images; a still image capturing control section for causing the image capturing section to capture a still image at a timing until a frame image following one frame image captured by the image capturing section is captured since the one image is captured when the still image capturing instruction reception section receives the instruction to capture the still image; a still image capturing timing recording section for recording a still image capturing timing at which the image capturing section captures the still image; a frame image before/after capturing extracting section for extracting a frame image before image-capturing and a frame image after image-capturing respectively which are captured before/after the still image capturing timing recorded on the still image capturing timing recording section; and a frame image generating section for generating a frame image at the timing at which the image capturing section captures the still image based on the frame image before image-capturing and the frame image after image-capturing which are extracted by the frame image before/after image-capturing extracting section.

The image capturing apparatus may further include an image capturing memory for storing a moving image including a plurality of frame images captured by the image capturing section, and a frame image identification information storage section for storing frame image identification information to identify each of the plurality of frame images stored in the image memory in association with information indicative of the timing at which each of the plurality of frame images stored in the image memory is captured. The frame image before/after image-capturing extracting section may extract the frame image identification information on the frame images before/after image-capturing from the frame image identification information storage section, and then, may extract the frame images before/after image-capturing from the image memory based on the extracted frame image identification information.

The still image capturing control section may cause the image capturing section to capture a still image as substitute for one frame image among the plurality of frame images captured by the image capturing section when the still image capturing instruction reception section receives an instruction to capture the still image. The still image capturing timing recording section may record frame image identification information to identify a frame image which could not be captured by the image capturing section as the still image capturing timing. The frame image before/after image-capturing extracting section may extract the frame image before image-capturing and the frame image after image-capturing captured respectively before/after the frame image identified by the frame image identification information recorded by the still image capturing timing recording section.

The image capturing apparatus may further include a mode setting section for selecting an image capturing mode in which the image capturing section captures a moving image or a still image, and another setting mode and for setting the same. The frame image before/after image-capturing extracting section may extract the frame image before image-capturing and the frame image after image-capturing based on the still image capturing timing when the mode setting section does not select the image capturing mode. The frame image generating section may generate a frame image at the timing at which the image capturing section captures the still image based on the frame image before image capturing and the frame image after image-capturing when the mode setting section does not select the image capturing mode.

The image capturing apparatus may further include an electric battery section for supplying electric power to the image capturing section, and a remaining battery level detecting section for detecting whether the remaining battery level in the electric battery section is more than a predetermined reference value. The frame image before/after image-capturing extracting section may extract the frame image capturing and the frame image after image-capturing based on the still image capturing timing when the remaining battery level detecting section detects that the remaining battery level in the electric battery section is more than the predetermined reference value. The frame image generating section may generate a frame image at the timing at which the image capturing section captures the still image based on the frame image before image-capturing and the frame image after image-capturing when the remaining battery level detecting section detects that the remaining battery level in the electric battery section is more than the predetermined reference value.

The image capturing apparatus may further include an image memory for storing a moving image and a still image captured by the image capturing section, and a frame image generated by the frame image generating section; an amount of space detecting section for detecting whether the amount of space in the image memory is more than a predetermined reference value. The frame image before/after image-capturing extracting section may extract the frame image before/image-capturing and the frame image after image-capturing based on the still image capturing timing when the amount of space detecting section detects that the amount of space in the image memory is more than a predetermined reference value. The frame image generating section may generate a frame image at the timing at which the image capturing section captures the still image based in the frame image before image-capturing and the frame image after image-capturing when the amount of space detecting section detects that the amount of space in the image memory is more than a predetermined reference value.

The image capturing apparatus may further include an image storage control section for preferentially deleting the frame image stored in the image memory, which is generated by the frame image generating section than the moving image and the still image stored in the image memory, which are captured by the image capturing section when the amount of space in the image memory for storing a moving image or a still image newly captured by the image capturing section is run short.

The frame image generating section may includes: a changed region specifying section for specifying a changed region which moves from the frame image before image-capturing to the frame image after image-capturing, and an unchanged region which does not move from the frame image before image-capturing to the frame image after image-capturing; an object extracting section for extracting an object moving from the frame image before image-capturing to the frame image after image-capturing extracted by the frame image before/after image-capturing, which is included in the still image captured by the image capturing section; an amount of change calculating section for calculating the amount of movement of the object extracted by the object extracting section before/after the still image capturing timing recorded on the still image capturing timing recording section in the changed region specified by the changed region specifying section based on the frame image before/image-capturing and the frame image after image-capturing extracted by the frame image before/after image-capturing extracting section; and a frame image combining section for generating an frame image at the timing at which the image capturing section captures the still image by performing a blur processing on the image in the changed region including the object extracted by the object extracting section, which is specified by the changed region specifying section.

The frame image generating section may further include an image capturing time difference calculating section for calculating a forward time difference between the still image capturing timing recorded by the still image capturing timing recording section and the timing at which the frame image before image-capturing extracted by the frame image before/after image-capturing extracting section is captured, and a backward time difference between the still image capturing timing recorded by the still image capturing timing recording section and the timing at which the frame image after image-capturing extracted by the frame image before/after image-capturing extracting section is captured. The amount of change calculating section may calculate a forward movement vector of the object extracted by the object extracting section between the still image capturing timing recorded by the still image capturing timing recording section and the timing at which the frame image before image-capturing extracted by the frame image before/after image-capturing extracting section is captured, and a backward movement vector of the object extracted by the object extracting section between the still image capturing timing recorded by the still image capturing timing recording section and the timing at which the frame image after image-capturing extracted by the frame image before/after image-capturing extracting section. The frame image combining section may perform a blur processing on the image in the changed region specified by the changed region specifying section in a direction directed by the forward movement vector calculated by the amount of change calculating section and perform a blur processing on the image in the changed region specified by the changed region specifying section in the direction directed by the backward movement vector calculated by the amount of change calculating section according to the backward time difference calculated by the image capturing time difference calculating section.

The frame image generating section may include: a composite ratio calculating section for calculating a composite ratio between the still image captured by the image capturing section and at least one of the frame image before image-capturing or the frame image after image capturing extracted by the frame image before/after image-capturing extracting section based on the still image capturing timing recorded by the still image capturing timing recording section and at least one of a forward frame image capturing timing at which the frame image before image-capturing extracted by the frame image before/after image-capturing extracting section is captured and a backward frame image capturing timing at which the frame image after image-capturing extracted by the frame image before/after image-capturing extracting section is captured; and a frame image combining section for generating a frame image at the timing at which the image capturing section captures the still image by combining the still image captured by the image capturing section with at least one of the frame image before image-capturing and the frame image after image-capturing extracted by the frame image before/after image-capturing extracting section at the composite ratio calculated by the composite ratio calculating section.

The frame image generating section may include: an exposure time recording section for recording a still image exposure time at which the image capturing section captures the still image; a composite ratio calculating section for calculating the composite ratio between the still image captured by the image capturing section and α1 east one of the frame image before image-capturing and the frame image after image-capturing extracted by the frame image before/after image-capturing extracting section; and a frame image combining section for generating a frame image at the timing at which the image capturing section captures the still image by combining the still image captured by the image capturing section with at least one of the frame image before image-capturing and the frame image after image-capturing extracted by the frame image before/after image-capturing extracting section.

A second aspect of the present invention provides an image capturing method. The image capturing method includes the steps of: capturing an image; capturing a moving image including a plurality of frame images in the image capturing step; receiving an instruction to capture a still image when the plurality of frame images are continuously captured in the image capturing step; capturing the still image at a timing until a frame image following one frame image captured in the image capturing step is captured since the one image is captured when the instruction to capture the still image is received in the still image capturing instruction receiving step; recording a still image capturing timing at which the still image is captured in the image-capturing step; extracting a frame image before image capturing and a frame image after image-capturing captured respectively before/after the still image capturing timing recorded in the still image capturing timing recording step from the plurality of frame images captured by the image capturing step; and generating a frame image at the timing at which the still image is captured in the image capturing step based on the frame image before image-capturing and the frame image after image-capturing extracted in the frame image before/after image-capturing extracting step.

A third aspect of the present invention provides a program for an image capturing apparatus. The program operates the image capturing apparatus to function as: an image capturing section; a moving image capturing control section for causing the image capturing section to capture a moving image including a plurality of frame images; a still image instruction reception section for receiving an instruction to capture a still image when the image capturing section continuously captures the plurality of frame images; a still image capturing control section for causing the image capturing section to capture a still image at a timing until a frame image following one frame image captured by the image capturing section is captured since the one image is captured when the still image capturing instruction reception section receives the instruction to capture the still image; a still image capturing timing recording section for recording a still image capturing timing at which the image capturing section captures the still image; a frame image before/after capturing extracting section for extracting a frame image before image-capturing and a frame image after image-capturing respectively which are captured before/after the still image capturing timing recorded on the still image capturing timing recording section; and a frame image generating section for generating a frame image at the timing at which the image capturing section captures the still image based on the frame image before image-capturing and the frame image after image-capturing which are extracted by the frame image before/after image-capturing extracting section.

Here, all necessary features of the present invention are not listed in the summary of the invention. The sub-combinations of the features may become the invention.

According to the present invention, even if a still image is captured during capturing a moving image, a frame image to be captured at the timing at which the still image is captured can be generated at the timing convenient for the image capturing apparatus without burdening the image capturing apparatus.

BRIEF DESCRIPTION OF THE DRAWINGS

FIG. 4 is a table showing an example of data stored in an image memory 290, a frame image identification information storage section 282 and still image capturing timing recording section 280;

DETAILED DESCRIPTION OF THE INVENTION

Hereinafter, the present invention will now be described through preferred embodiments. The embodiments do not limit the invention according to claims and all combinations of the features described in the embodiments are not necessarily essential to means for solving the problems of the invention.

Figure 1:
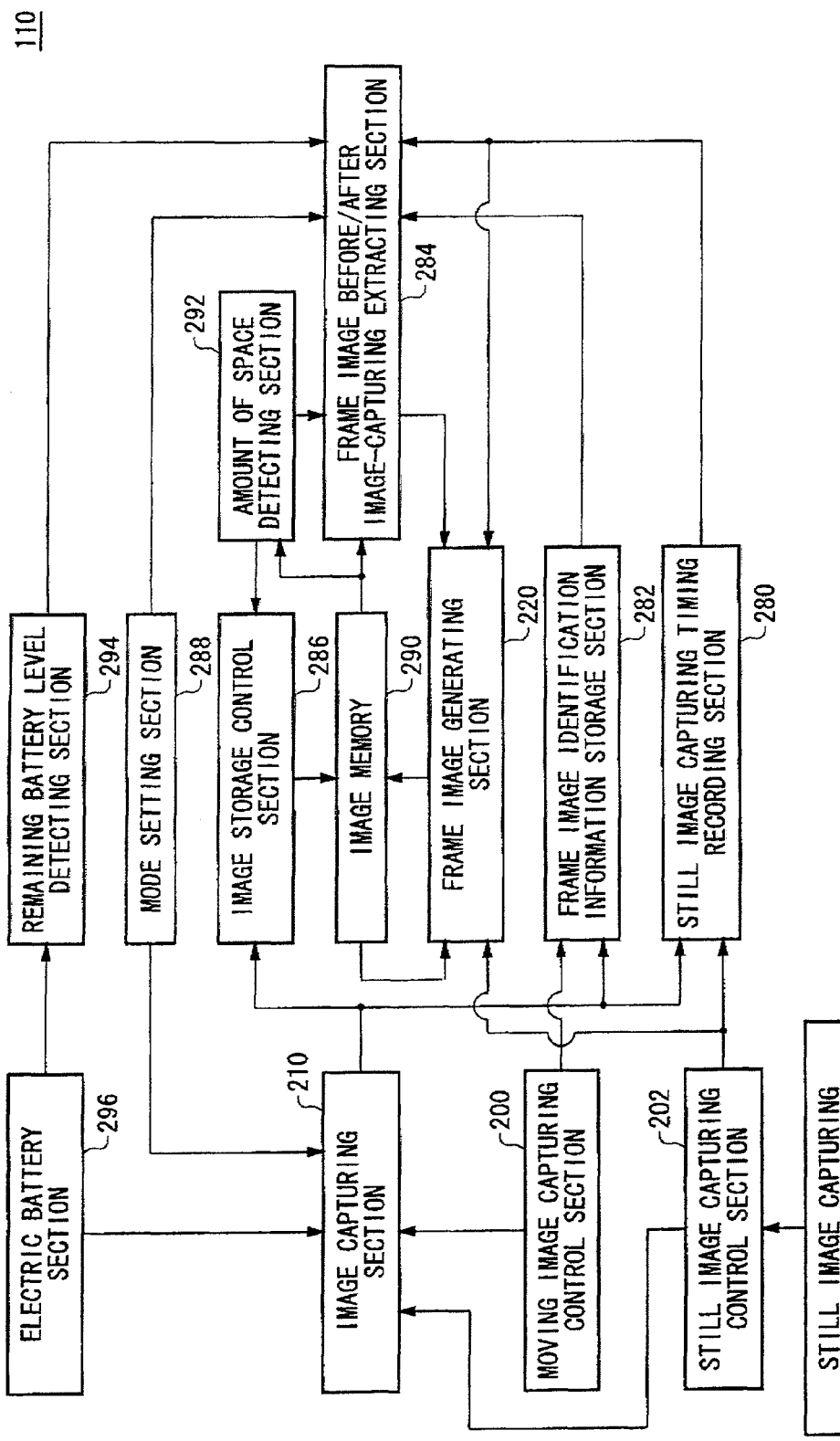
FIG. 1 shows an example of the block configuration of an image capturing apparatus 110.

FIG. 1 shows an example of the block configuration of an image capturing apparatus 110 according to an embodiment of the present invention. The image capturing apparatus 110 according to the present embodiment captures a still image instead of a frame image for a moving image and records the same when a release button is pushed by a photographer. At this time, the image capturing apparatus 110 records the timing at which the still image is captured and restarts to capture a subsequent frame image. Then, the image capturing apparatus 110 combines the frame images captured before/after the timing at which the still image is captured to generate a frame image which should have been captured at the timing at which the still image is captured and records the same.

The image capturing apparatus 110 includes a moving image capturing control section 200, a still image capturing instruction reception section 201, a still image capturing control section 202, an image capturing section 210, a frame image generating section 220, a still image capturing timing recording section 280, a frame image identification information storage section 282, a frame image before/after image-capturing extracting section 284, an image storage control section 286, a mode setting section 288, an image memory 290, an amount of space detecting section 292, a remaining battery level detecting section 294 and an electric battery section 196. The image capturing section 210 captures a frame image and a still image. Specifically, the image capturing section 210 exposes an imaging device such as a CCD to light from a subject to capture an image of the subject.

The moving image capturing control section 200 causes the image capturing section to capture a moving image including a plurality of frame images. For example, the moving image capturing control section 200 controls an exposure start time at which the imaging device of the image capturing section 210 is exposed and an exposure time. The still image capturing instruction reception section 201 receives an instruction to capture the still image when the image capturing section 210 continuously captures the plurality of frame images. Then, the still image capturing control section 202 causes the image capturing section 210 to capture the still image at the timing until a frame image following one frame image captured by the image capturing section 210 is captured since the one image is captured when the still image capturing instruction reception section receives the instruction to capture the still image.

The still image capturing timing recording section 280 records a still image capturing timing at which the image capturing section 210 captures the still image. Then, the frame image before/after image-capturing extracting section 284 extracts a frame image before image-capturing and a frame image after image-capturing captured respectively before/after the still image capturing timing recorded by the still image capturing timing recording section 280 from the plurality of frame images captured by the image capturing section 210. Then, the frame image generating section 220 generates a frame image at the timing at which the image capturing section 210 captures the still image based on the frame image before image-capturing and the frame image after image-capturing extracted by the frame image before/after image-capturing extracting section 284. Therefore, the frame image generating section 220 can generate the frame image at the timing at which the image capturing section 110 captures the still image at any timing after terminating to capture moving images.

Here, the frame image at the timing at which the image capturing section 210 captures the still image may be a frame image to be obtained until a subsequent frame image is captured since the previous frame image is captured. Specifically, the frame image at the timing at which the image capturing section 210 captures the still image may be a frame image to be obtained for a period from an exposure ending time of the frame image captured at the timing before the timing at which the still image is captured to an exposure starting time of the frame image captured at the timing after the timing at which the still image is captured. Additionally, the still image capturing control section 202 may cause the image capturing section 210 to capture the still image instead of one frame image among a plurality of frame images captured by the image capturing section 210 when the still image capturing instruction reception section 201 receives an instruction to capture the still image. In this case, the frame image at the timing at which the image capturing section 210 captures the still image may be an alternate frame image substituted for the frame image which could not have been captured because the image capturing section 210 captures the still image instead of one frame image among a plurality of frame images.

The image memory 290 stores a moving image including a plurality of frame images captured by the image capturing section 210. Then, the frame image identification information storage section 282 stores frame image identification information to identify each of the plurality of frame images stored in the image memory 290 in association with information indicative of the timing at which each of the plurality of frame images stored in the image memory 290 is captured. Then, the frame image before/after image-capturing extracting section 284 extracts the frame image identification information on the frame image before image-capturing and the frame image after image-capturing from the frame image identification information storage section 282 based on the still image capturing timing recorded on the still image capturing timing recording section 280, Then, the frame image before/after image-capturing extracting section 284 extracts the frame image before image-capturing and the frame image after image-capturing from the image memory 290 based on the extracted frame image identification information.

Here, the timing at which each of the frame images is captured may be a time at which each of the frame images is captured, and also may be information indicative of the order at which each of the frame images is captured, such as a sequence number.

Additionally, the still image capturing timing recording section 280 may record frame image identification information to identify the frame image which could not have been captured because the image capturing section 210 captures the still image as a still image capturing timing. Then, the frame image before/after image-capturing extracting section 284 extracts the frame image before image-capturing and the frame image after image-capturing captured respectively before/after the frame image identified by the frame image identification information recorded by the still image capturing timing recording section 280.

The mode setting section 288 selects an image capturing mode in which the image capturing section 210 captures a moving image or a still image, and another setting mode, and sets the same. Then, the fume image before/after image-capturing extracting section 284 extracts the frame image before image-capturing and the frame image after image-capturing based on the still image capturing timing when the mode setting section 288 does not select the image capturing mode. Then, the frame image generating section 220 generates a frame image at the timing at which the image capturing section 210 captures the still image based on the frame image before image-capturing and the frame image after image-capturing when the mode setting section 288 does not select the image capturing mode.

For example, the image capturing apparatus 110 has a display mode in which images including the captured moving image and the still image are displayed, and a standby mode being capable of shifting to the image capturing mode on immediately receiving an instruction by a photographer as the setting modes other than the image capturing mode. Then, the frame image before/after image-capturing extracting section 284 extracts the frame image before image-capturing and the frame image after image-capturing based on the still image capturing timing when the mode setting section 228 selects the standby mode. Therefore, when the load of the image capturing apparatus 100 is reduced, a processing to generate a frame image can be performed.

The electric battery section 296 supplies an electric power to the image capturing section 210. The remaining battery level detecting section 294 detects whether the remaining battery level in the electric buttery section 296 is more than a predetermined reference value. For example, the remaining battery level detecting section 294 detects whether the remaining battery level in the electric buttery section 296 is more than a predetermined reference value based on the voltage between terminals in the electric buttery section 296. Then, the frame image before/after image-capturing extracting section 284 extracts the frame image before image-capturing and the frame image after image-capturing based on the still image capturing timing when the remaining battery level detecting section detects that the remaining battery level in the electric buttery section 296 is more than a predetermined reference value. Then, the frame image generating section 220 generates a frame image at the timing at which the image capturing section 210 captures the still image based on the frame image before image-capturing and the frame image after image-capturing when the remaining battery level detecting section detects that the remaining battery level in the electric buttery section 296 is more than a predetermined reference value. Therefore, the image capturing apparatus 110 can previously prevent the remaining level of the electric battery from running short due to a processing to generate the frame image.

The image memory 290 stores the moving image and the still image captured by the image capturing section 210, and the frame image generated by the frame image generating section 220. The amount of space detecting section 292 detects whether the amount of space in the image memory 290 is more than a predetermined reference value. Then, the frame image before/after image-capturing extracting section 284 extracts the frame image before image-capturing and the frame image after image-capturing based on the still image capturing timing when the amount of space detecting section 292 detects that the amount of space in the image memory 290 is more than the predetermined reference value. Then, the frame image generating section 220 generates a frame image at which the image capturing section 210 captures the still image based on the frame images before/after image-capturing when the amount of space detecting section 292 detects that the amount of space in the image memory 290 is more than the predetermined reference value. Therefore, the image capturing apparatus 110 can previously prevent the image memory 290 from being fully occupied by the frame images generated by the frame image generating section 220.

The image storage control section 286 preferentially deletes the frame image generated by the frame image generating section 220, which is stored in the image memory 290 from the moving image and the still image captured by the image capturing section 210, which are stored in the image memory 290 when the amount of space for storing the moving image or the still image newly captured by the image capturing section 210 runs short, and causes the image capturing section 210 to store the moving image or the still image newly captured by the image capturing section 210 in the image memory 290. Therefore, the image capturing apparatus 110 can previously prevent the image memory 290 from being fully occupied by the frame image generated by the frame image generating section 220.

As described above, the image capturing apparatus 110 according to the present embodiment can create a frame image to be captured at the timing at which the still image is captured at the desired timing for the image capturing apparatus 110.

Figure 2:
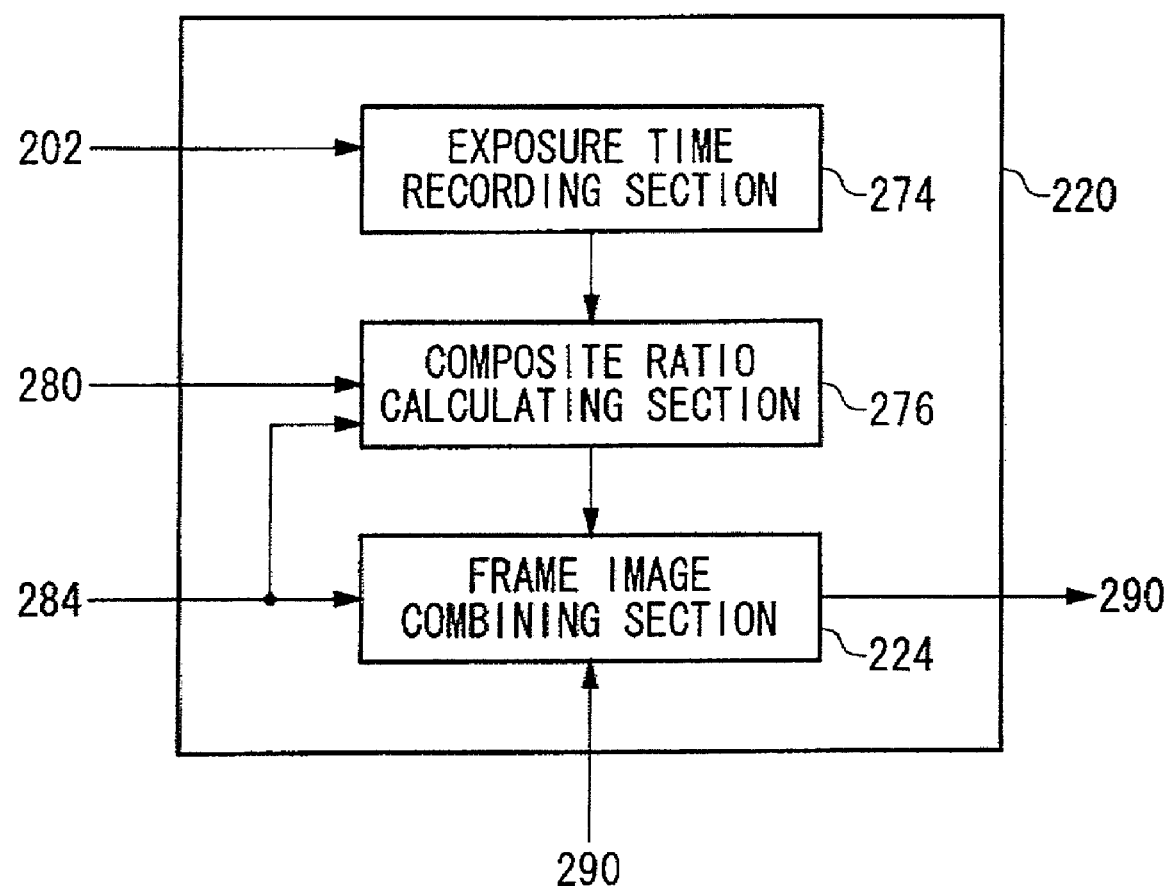
FIG. 2 shows an example of the block configuration of a frame image generating section 220.

FIG. 2 shows an example of the block configuration of a frame image generating section 220. The frame image generating section according to the present embodiment includes an exposure time recording section 274, a composite ratio calculating section 276 and a frame image combining section 224.

The composite ratio calculating section 276 calculates the composite ratio between the still image captured by the image capturing section 210 and at least one of the frame image before image-capturing and the frame image after image-capturing extracted by the frame image extracting section 284 based on the still image capturing timing recorded by the still image capturing timing recording section 280 and at least one of a forward frame image capturing timing at which the frame image before image-capturing extracted by the frame image before/after image-capturing extracting section 284 and a backward frame image capturing timing at which the frame image after image-capturing extracted by the frame image before/after image-capturing extracting section 284. Then, the frame image combining section 224 combines the still image captured by the image capturing section 210 with at least one of the frame image before image-capturing and the frame image after image-capturing extracted by the frame image before/after image-capturing extracting section 284 at the composite ratio calculated by the composite ratio calculating section 276 to generate a frame image at the timing at which the image capturing section 210 captures the still image.

Specifically, the exposure time recording section 274 records a still image exposure time at which the image capturing section 210 captures the still image. Then, the composite ratio calculating section 276 calculates the composite ratio between the still image captured by the image capturing section 210 and at least one of the frame image before image-capturing and the frame image after image-capturing extracted by the frame image before/after image-capturing extracting section 284 based on the still image exposure time recorded by the exposure time recording section 274. For example, the composite ratio calculating section 276 calculates the composite ratio of the still image larger than the composite ratio of at least one of the frame image before image-capturing or the frame image after image-capturing in the case that the exposure time when the image capturing section 210 captures the still image is longer.

Then, the frame image combining section 224 combines the still image captured by the image capturing section 210 with at least one of the frame image before image-capturing and the frame image after image-capturing extracted by the frame image before/after image-capturing extracting section 284 at the composite ratio calculated by the composite ratio calculating section 276 to generate a frame image at the timing at which the image capturing section 210 captures the still image.

Figure 3:
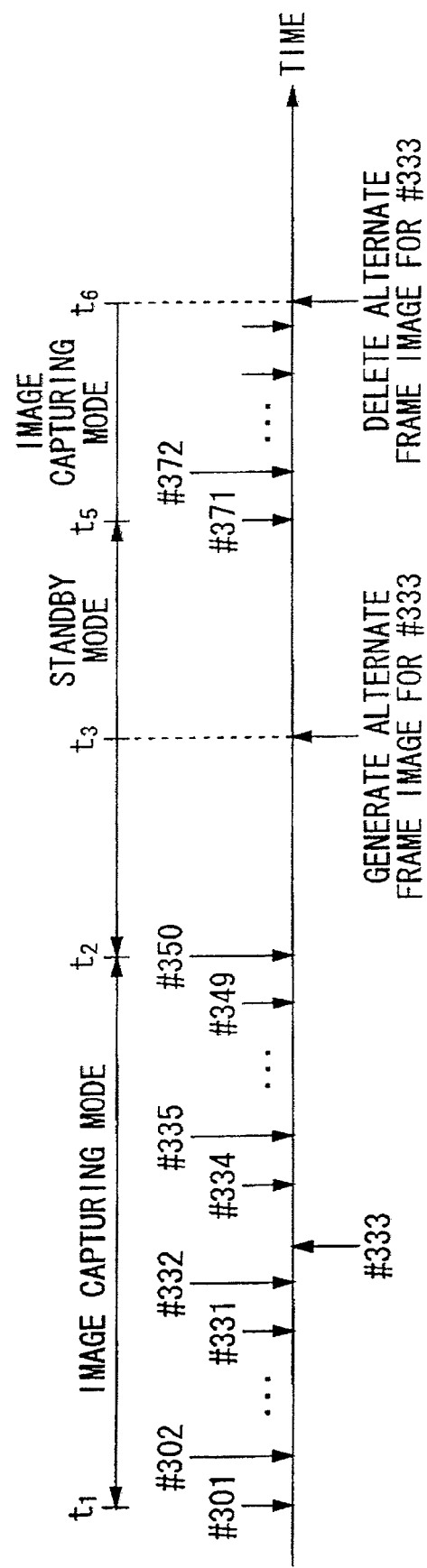
FIG. 3 shows an example of an image capturing sequence by the image capturing apparatus 110.

FIG. 3 shows an example of an image capturing sequence by the image capturing apparatus 110. The image capturing section 210 captures frame images for a moving image at timings #301, #302, . . . #331, #332, #334, #335, . . . #349, #350 from time t1 to time t2. Then, when a photographer pushes a release button, the image capturing section 210 captures a still image instead of the frame image at the timing #333 and records the same. Then, the more setting section 288 sets the mode of the image capturing apparatus 110 to a standby mode at the image capturing ending time t2. Then, the frame image before/after image-capturing extracting section 284 generates an alternate frame image to be captured at the timing #333 at the time t3 which passes a predetermined time since the standby mode is set and stores the same in the image memory 290.

Then, the mode of the image capturing apparatus 110 is shifted again to the image capturing mode from time t5 to time t6 by the operation of the photographer and captures frame images for the moving image at timing #372, #372 . . . . Then, the image storage control section 286 deletes the alternate frame from the image memory 290 when the capturing of the moving image is completed, or it is detected that the amount of space in the image memory 29 is decreased while the moving image is captured. As shown in FIG. 3, the alternate frame image for #333 is deleted from the image memory 290 at the end of capturing the moving image. Thus, the image capturing apparatus 110 can select any timing convenient for the image capturing apparatus 110 before/after capturing the moving image without burdening the image capturing apparatus 110 and generate an alternate frame.

FIG. 4 is a table showing an example of data stored in the image memory 290, the frame image identification information storage section 282 and the still image capturing timing recording section 280. The image memory 290 stores a frame image and a still image captured by the image capturing section 210, and an alternate frame image generated by the frame image generating section 220 in association with each image ID. For example, the image memory 290 stores a frame image 10331 indicated by an image ID #10331, an alternate frame image 10333 indicated by an image ID #10333 and a still image 20333 indicated by an image ID #20333.

Additionally, the frame image identification information storage section 282 stores the image IDs #10331, #10332, #10334 in association with each of the timing IDs #331, #332 and #334 . . . at which the image capturing section 210 captures. Additionally, the still image capturing timing recording section 280 stores an image ID #20333 indicative of the still image captured by the image capturing section 210 instead of the frame image in association with a timing ID #333 at which the frame image should be captured. Therefore, the frame image before/after extracting section 284 can extract the frame images 10332 and 10334 captured at the timing before/after the still image 20333 is captured by extracting the timings #331 and #332 before/after the timing ID #333 at which the still image is captured.

Here, the data stored by the frame image identification information storage section 282 and the still image capturing timing recording section 280 may be stored in the image memory 290 and also may be stored in the memory other than the image memory 290. Additionally, the timing ID may be the time captured by the image capturing section 210 and also may be a sequence number of a frame image, and a symbol such as a numeric value indicative of the order of the image captured by the image capturing section.

Figure 5:
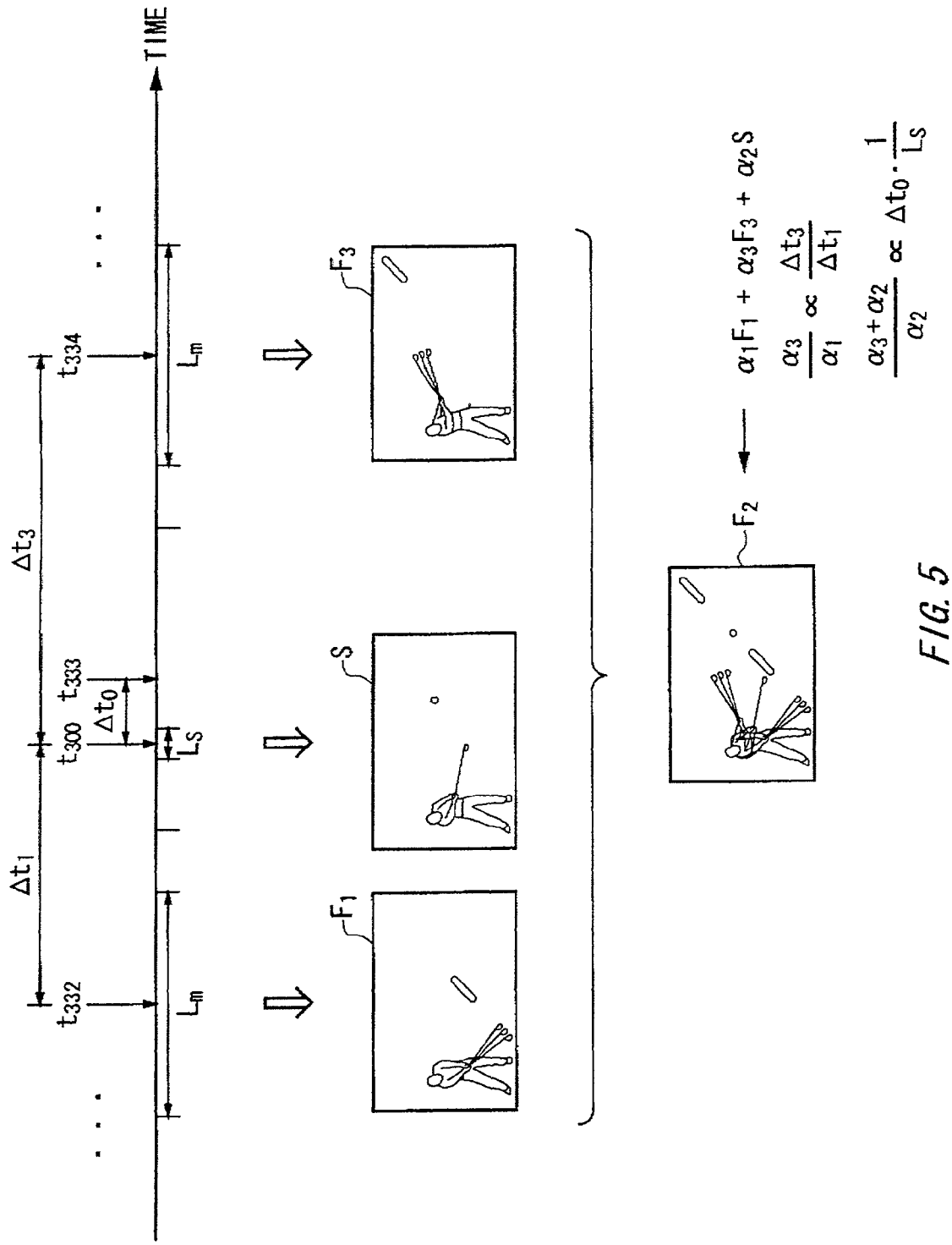
FIG. 5 shows an example of a process to generate an alternate frame by a frame image combining section 224.

FIG. 5 shows an example of a process to generate an alternate frame by the image capturing apparatus 110. As shown in FIG. 5, timings at which the image capturing section 210 captures moving images are provided by exposure time period Lm of which intermediate point in the exposure period is a time t332 and t334 . . . , respectively. Then, the still image capturing control section 202 causes the image capturing section 210 to capture the still image at the timing such that a time t300 is the intermediate point of the exposure period when the release button is pushed. Thereby the image capturing apparatus 110 acquires a still image S, a frame image before image-capturing F1 captured before the still image S and a frame image after image-capturing F3 captured after the still image S.

Here, the still image capturing control section 202 discharges once a charge accumulated by the imaging device such as a CCD, and then newly starts to exposure the imaging device in order to capture the still image.

Here, the fume image identification information storage section 282 stores a timing (forward frame image capturing timing t332 and backward frame image capturing timing t334) indicative of the time at the intermediate point of the exposure period at which the frame image is captured. The still image capturing timing recording section 280 records information indicative of a middle frame image capturing timing t333 indicative of the intermediate time of the exposure period at which the frame image not being captured because the still image S is captured should be captured as frame image identification information. Here, the still image capturing timing recording section 280 may further record the timing (still image capturing timing t300) indicative of the intermediate time of the exposure period at which the imaging device of the image capturing apparatus 210 is exposed in order to capture the still image S.

Then, the composite ratio calculating section 276 calculates composite ratio α1, α2 and α3 for which the frame image before image-capturing F1, the still image S and the frame image after image-capturing F3 are combined. At this time, a composite ratio calculating section 276 calculates a time difference Δt1 between the still image capturing timing t300 and the forward frame image capturing timing t332, and a time difference Δt3 between the backward frame image capturing timing t334 and the still image capturing timing t300. Then, the composite ratio calculating section 276 proportionates the ratio between the composite ratio α3 of the frame image after image-capturing F3 and the composite ratio α1 of the frame image before image-capturing F1 to the ratio between the time difference Δt3 and the time difference Δt1. Thereby the image capturing apparatus 110 can combine the images with an appropriate composite ratio dependent on the time-position between the still image capturing timing t300 and the middle frame image capturing timing t333, so that the trajectory of the movement of the subject recorded on the frame image before image-capturing F1 or the frame image after image-capturing F3 can be reflected on the alternate frame image F2.

Then, the composite ratio calculating section 276 calculates a time difference Δt0 between the middle frame image capturing timing t333 and the still image capturing timing t300. Then, the composite ratio calculating section 276 proportionates the ratio between the composite ratio α2 of the still image S and the sum of the composite ratio α1 of the frame image before image-capturing and the composite ratio α3 of the frame image after image-capturing F3 to the product obtained by multiplying the time difference Δt0 by the inverse number of the still image exposure time Ls. Thereby the longer the still image exposure time Ls is, the more the contribution ratio of the still image S to the alternate frame F2 can be increased in the composite ratio calculating section 276. Additionally, in the composite ratio calculating section 276, the contribution ratio of the still image S to the alternate frame F2 can be reduced when the still image capturing timing t300 is for from the middle frame image capturing timing t333. Therefore, the image capturing apparatus 110 can reflect the trajectory of the movement of the subject not being shown on the still image S on the alternate frame F2.

Then, the image capturing apparatus 110 records the alternate frame image F2 generated by the frame image combining section 224 as the frame image captured at the middle frame image capturing timing t333. As described above, the image capturing apparatus 110 can generate an alternate frame image on which the position and movement of the subject is reflected.

Figure 6:
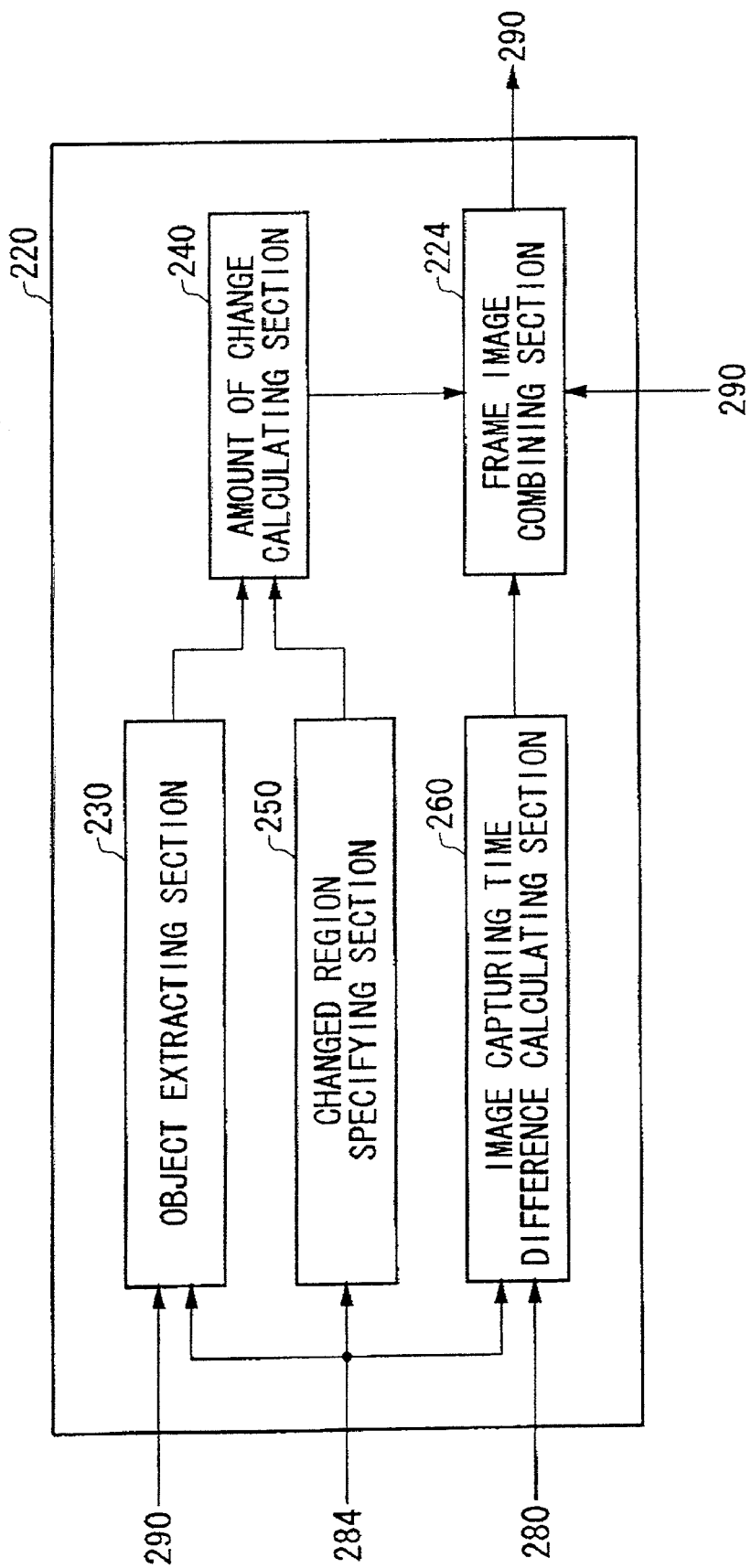
FIG. 6 shows another example of the block configuration of the frame image generating section 220.

FIG. 6 shows another example of the block configuration of the frame image generating section 220. The frame image generating section 220 includes a changed region specifying section 250, an object extracting section 230, an amount of change calculating section 240, an image capturing time difference calculating section 260 and a frame image combining section 224.

The changed region specifying section 250 specifies a changed region which moves from the frame image before image-capturing to the frame image after image-capturing, and an unchanged region which does not move from the frame image before image-capturing to the frame image after image-capturing. Then, the object extracting section 230 extracts an object included in the still image captured by the image capturing section 210, which moves from the frame image before image-capturing to the frame image after image-capturing extracted by the frame image before/after image-capturing extracting section 284.

Then, the amount of change calculating section 240 calculates the amount of movement of the object extracted by the object extracting section 230 before/after the still image capturing timing recorded by the still image capturing timing recording section 280 in the changed region specified by the changed region specifying section 250 based on the frame image before image-capturing and the frame image after image-capturing extracted by the frame image before/after image-capturing extracting section 284. Then, the frame image combining section 224 performs a blur processing on the image in the changed region including the object extracted by the object extracting section, which is specified by the changed region specifying section 250 to generate a frame image at the timing at which the image capturing section 210 captures the still image. For example, the frame image combining section 224 performs the blur processing such that the larger the movement of the subject is, the larger the amount of blur processing is performed on the image on the changed region. Thereby the frame image combining section 224 can generate the frame image on which the appropriate blur processing has been performed dependent on the magnitude of the movement of the subject.

The image capturing time difference calculating section 260 calculates a forward time difference between the still image capturing timing recorded by the still image capturing timing recording section 280 and the timing at which the frame image before image-capturing extracted by the frame image before/after image-capturing extracting section 284, and a backward time difference between the still image capturing timing recorded by the still image capturing timing recording section 280 and the timing at which the frame image after image-capturing extracted by the frame image before/after image-capturing extracting section 284. Then, the amount of change calculating section 240 calculates a forward movement vector which is a movement vector of the object extracted by the object extracting section 230 between the still image capturing timing recorded by the still image capturing timing recording section 280 and the timing at which the frame image before image-capturing extracted by the frame image before/after image-capturing extracting section 284 is captured, and a backward movement vector which is a movement vector of the object extracted by the object extracting section between the still image capturing timing recorded by the still image capturing timing recording section 280 and the timing at which the frame image after image-capturing extracted by the frame image before/after image-capturing 284 is captured based on the frame image before image-capturing and the frame image after image-capturing extracted by the frame image before/after image-capturing extracting section 284 and the still image captured by the image capturing section 210. Then, the frame image combining section 224 performs a blur processing on the image in the changed region specified by the changed region specifying section 250 in the direction directed by the forward movement vector calculated by the amount of change calculating section 240 dependent on the forward time difference calculated by the image capturing time difference calculating section 260, and performs a blur processing on the image in the changed region specified by the changed region specifying section 250 in the direction directed by the backward movement vector calculated by the amount of change calculating section 240 dependent on the backward time difference calculated by the image capturing time difference calculating section 260. Therefore, the frame image combining section 224 can generate an alternate frame image on which the appropriate blur processing according to the speed at which the subject moves has been performed.

Figure 7:
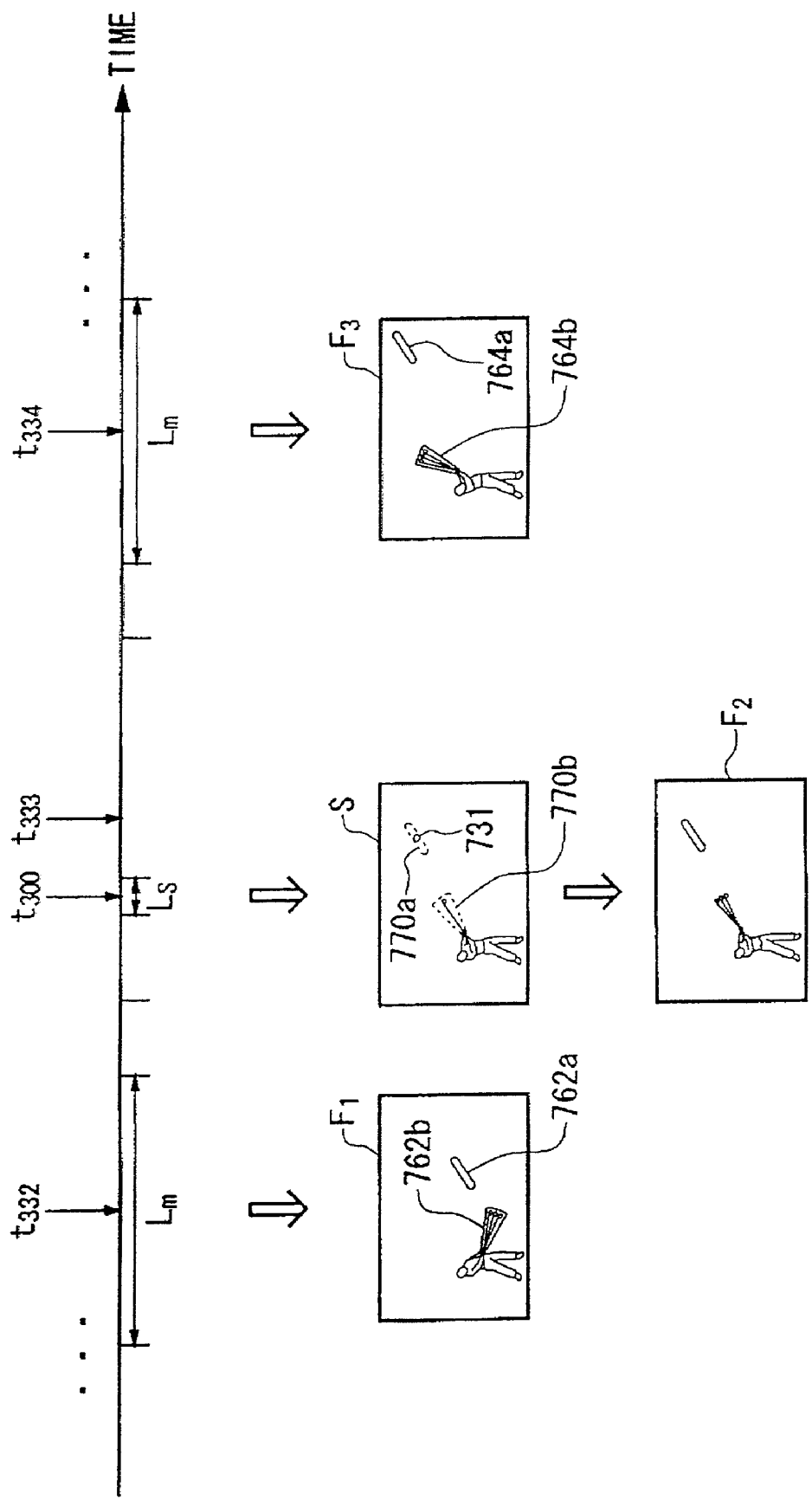
FIG. 7 shows an example of a process to generate an alternate frame by a frame image combining section 224.

FIG. 7 shows an example of a process to generate an alternate frame by the image capturing apparatus 110. The image capturing sequence according to the present embodiment is the same as the sequence to capture the frame image and the still image with reference to FIG. 5, so that the description is omitted.

As shown in FIG. 7, the changed region specifying section 250 generates a difference image between the frame image before image-capturing F1 and the frame image after image-capturing F3 and a difference region of which index value such as a luminance value indicative of the amount of difference is more than a predetermined reference value in the generated difference image. For example, deference regions 762a and 762b in the frame image before image-capturing F1, and difference regions 764a and 764b in the frame image after image-capturing F3 are extracted in the difference image. Then, the changed region specifying section 250 specifies a set of difference regions each of which shape is similar in the specified difference regions, (a set of difference regions 762a and 764a, and a set of difference regions 762b and 764b). Then, the changed region specifying section 250 calculates the amount of change of such as the degree of movement and rotating of the barycentric position, and the degree of transform of the shape in the difference region until the frame image after image-capturing F3 is captured since the frame image before image-capturing F1 is captured. Then, the changed region specifying section 250 calculates a region in which the object moving in the moving image should be captured at the timing at which the still image S is captured based on the calculated amount of change and the timing at which the still image S, the frame image before image-capturing F1 and the frame image after image-capturing F3 are captured and specifies the same as changed regions 770a and 770b. Then, the changed region specifying section 250 specifies the image region other than the changed regions 770a and 770b as an unchanged region in the still image S.

Here, the changed region specifying section 250 may extract a low-frequency image region with a spatial frequency lower than a predetermined reference frequency for each of the plurality of frame images and specify a set of low-frequency image regions each of which shape is similar in the plurality of frame images. Then, the change region specifying section 250 selects a set of low-frequency image regions each of which location on the frame image is further than a predetermined distance. Then, the changed region specifying section 250 calculates the amount of change such as the degree of movement of the barycentric position, the degree of rotating and the degree of transform of the shape in the low-frequency image region. Then, the changed region specifying section 250 may treat the selected set of low-frequency image regions as the set of difference regions each of which shape is similar to specify the changed region in the still image to specify the changed region in the still image.

Then, the object extracting section 230 extracts an moving object from objects in the changed region in the still image. For example, the object extracting section 230 may extract an object 731 located at the center of a changed region 770a which is specified as the moving object. Then, the frame image combining section 224 performs a blur processing on the extracted object to blur within the changed region. Then, the frame image combining section 224 combines the image on which the blur processing has been performed in the changed region and the image in the unchanged region to generate an alternate frame F2. For example, the frame image combining section 224 performs a diffusing processing on the moving object 731 in the moving direction of the object 731 in the changed region. Here, the detail of the method for calculating the amount of change and the blur processing in the changed region will be described later with reference to FIG. 8.

As described above, the image capturing apparatus 110 generates the alternate frame obtained by blurring the moving object in the still image region in which the moving subject is located, so that the movement of the subject can be prevented from discontinuing when the moving image is reproduced.

Figure 8:
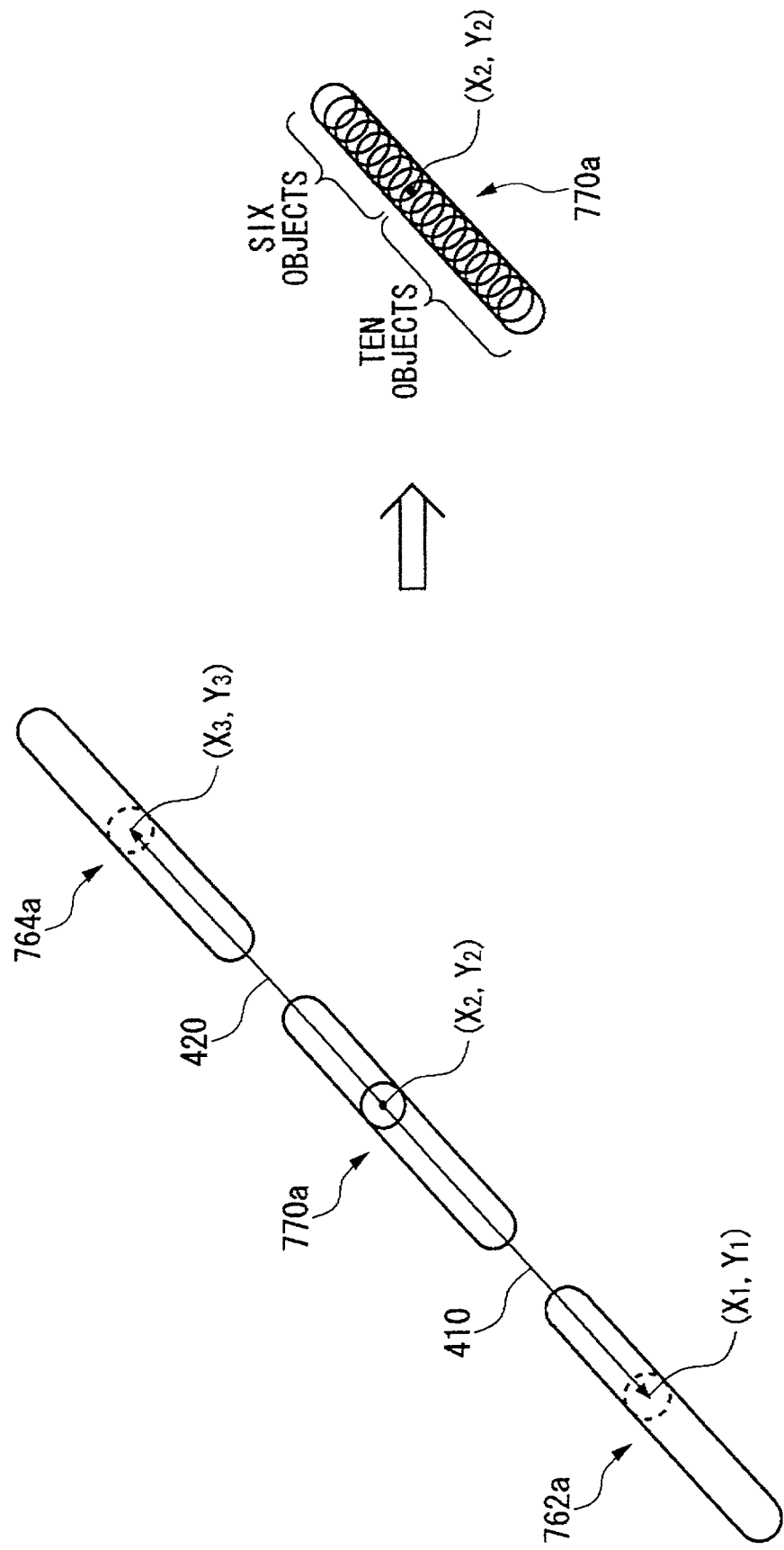
FIG. 8 shows an example of a blur processing by the frame image combining section 224.

FIG. 8 shows an example of a blur processing by the frame image combining section 224. The frame image combining section 224 calculates a coordinate of the center of gravity (X1, Y1) of the difference region in the frame image captured at the timing immediately before the still image is captured and a coordinate of the center of gravity (X3, Y3) of the difference region in the frame image captured at the timing after the still image is captured. Then, the frame image combining section 224 calculates a forward movement vector 410 (X1-X2, Y1-Y2) and a backward movement vector 420 (X3-X2, Y3-Y2) based on a coordinate of the center of gravity (X2, Y2) of the object obtained in the still image.

Then, the frame image combining section 224 places a plurality of images of the object 731 in the forward movement vector 410 and the backward movement vector 420 in the changed region and averages the images to perform a blur processing. At this time, the frame image combining section 224 may perform the blur processing with larger amount of blur when the magnitude for each movement vector is larger.

Specifically, the frame image combining section 224 may place larger number of objects in the direction of the movement vector and average the same when the magnitude of the movement vector is larger. As shown in FIG. 8, ten objects 731 are arranged in the direction of the forward movement vector 410 and six objects 731 are arranged in the direction of the backward movement vector 420 and averaged the same. At this time, the average luminance value of the objects used for averaging is the same for each direction of the movement vector. Then, the frame image combining section 224 superimposes the averaged image on a background image of the object. Thereby the larger the magnitude of the movement vector is, the smaller the luminance value for each of the placed object is due to the averaging. Therefore, the magnitude of the movement of the object can be appropriately presented. Additionally, the frame image combining section 224 may extend the object 731 to the direction of each movement vector by the amount of extending in proportion to the size of the movement vector to perform the blur processing.

Additionally, the image capturing time difference calculating section 260 calculates the difference between the timing at which the still image is captured and the timing at which the frame image before image-capturing is captured as a forward time difference, and calculates the difference between the timing at which the frame image after image-capturing is captured and the timing at which the still image is captured as a backward time difference. Then, the frame image combining section 224 calculates a forward movement speed indicative of the movement of the object based on the forward movement vector and the forward time difference, and calculates a backward movement speed indicative of the movement of the object based on the backward movement vector and the backward time difference. Then, the frame image combining section 224 performs the blur processing according to the calculated forward movement speed and backward movement speed. For example, the frame image combining section 224 sets larger amount of blur if the magnitude of the forward movement speed and the magnitude of the backward movement speed are larger.

As described above, the frame image generating section 220 can perform the blur processing on the moving image region in the still image captured during capturing a moving image, and generate a clear alternate frame in the unmoving image region. Thereby in the reproduced and displayed moving image, the movement of the moving subject can be prevented from discontinuing before/after the timing at which the alternate frame is reproduced and displayed.

According to the image capturing apparatus 110 of the present embodiment, the timing at which the still image is captured is recorded during capturing the moving image, so that an alternate frame image can be generated at any timing before/after the moving image is captured. Therefore, the image capturing apparatus 110 can generate the alternate frame in the time period for which the load of the image capturing apparatus 110 is reduced. Additionally, the image capturing apparatus 110 outputs frame image data and still image data, and the timing at which the frame image and the still image are captured to an external moving image reproducing apparatus, so that the moving image reproducing apparatus can generate an alternate frame image at reproducing a moving image.

Figure 9:
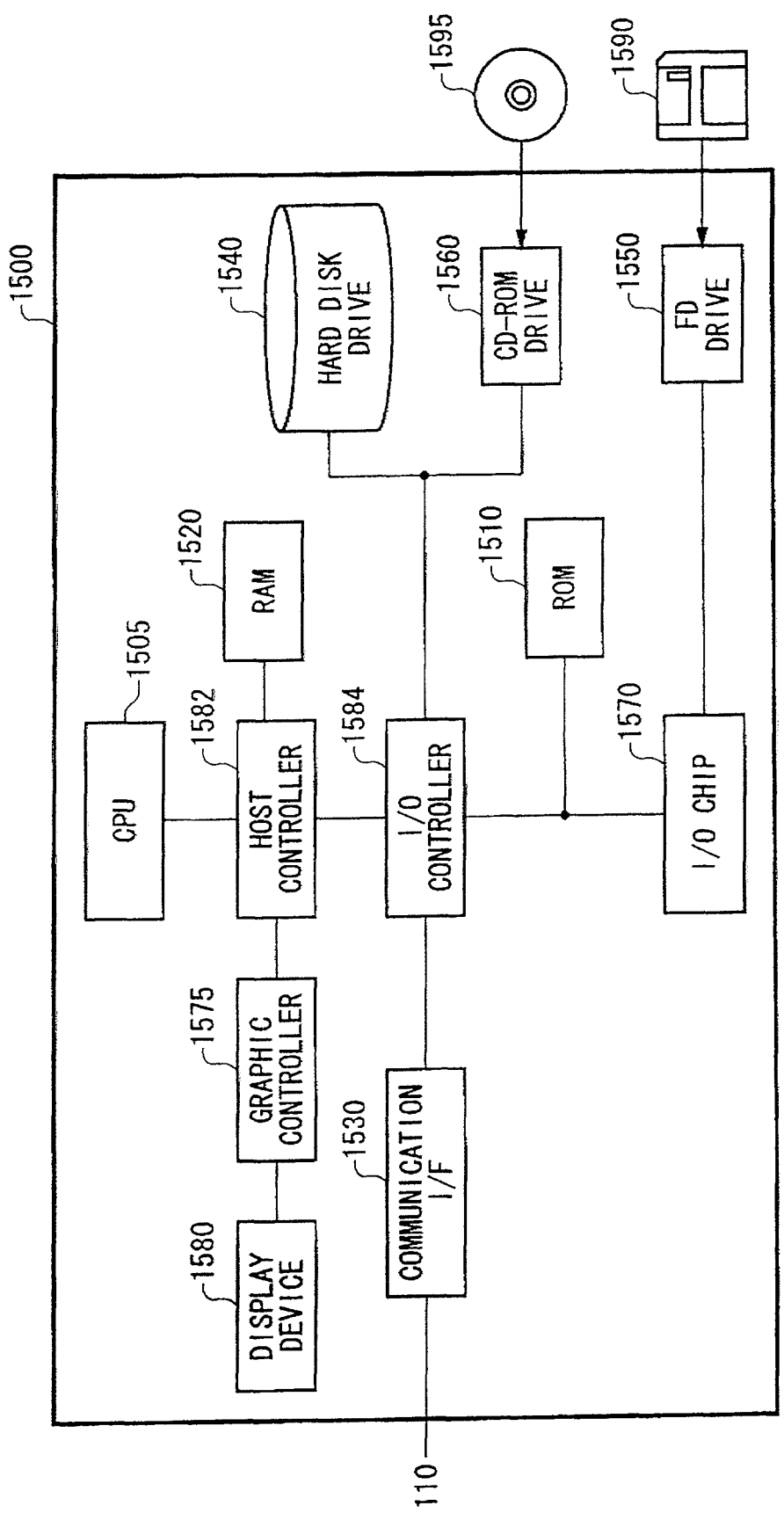
FIG. 9 shows an example of a hardware configuration of a computer 1500 of the image capturing apparatus 110.

FIG. 9 shows an example of the hardware configuration of the computer 1500 of the image capturing apparatus 110. The computer 1500 includes a CPU periphery having a CPU 1505, a RAM 1520, a graphic controller 1575 and a display 1580 which are connected through a host controller 1582 each other, an input/output unit having a communication interface 1530, a hard disk drive 1540 and a CD-ROM drive 1560 which are connected to the host controller 1582 through an input/output controller 1584 and a legacy input/output unit having a ROM 1510, a flexible disk drive 1550 and an input/output chip 1570 which are connected to the input/output controller 1584.

The host controller 1582 connects the RAM 1520 to the CPU 1505 and the graphic controller 1575 which access the RAM 1520 with a high transfer rate. The CPU 1505 operates according to the programs stored in the ROM 1510 and the RAM 1520 to control each unit. The graphic controller 1575 obtains image data generated on a frame buffer provided in the RAM 1520 by the CPU 1505 and displays the same on the display 1580. Alternatively, the graphic controller 1575 may include therein a frame buffer for storing image data generated by the CPU 1505.

The input/output controller 1584 connects the host controller 1582 to the hard disk drive 1540, the communication interface 1530 and the CD-ROM drive 1560 which are relatively high-speed input/output units. The hard disk drive 1540 stores the program and data used by the CPU 1505 in the computer 1500. The communication interface 1530 is connected to the image capturing apparatus 110 through the network and provides the program and data to the image capturing apparatus 110. The CD-ROM drive 1560 reads the program or data from the CD-ROM 1595 and provides the same to the hard disk drive 1540 and the communication interface 1530 through the RAM 1520.

The ROM 1510, and the flexible disk drive 1550 and input/output chip 1570 which are relatively low-speed input/output units are connected to the input/output controller 1584. The ROM 1510 stores a boot program executed by the computer 1500 at activating and a program depending on the hardware of the computer 1500. The flexible disk drive 1550 reads the program or data from a flexible disk 1590 and provides the same to the hard disk drive 1540 and the communication interface 1530 through the RAM 1520. The input/output chip 1570 connects various input/output units through the flexible disk drive 1550 and such as a parallel port, a serial port, a keyboard port and a mouse port.

The program provided to the communication interface 1530 through the RAM 1520 is stored in a recording medium, such as the flexible disk 1590, the CD-ROM 1595, or an IC card and provided by the user. The program is read from the recording medium, provided to the communication interface 1530 through the RAM 1520 and transmitted to the image capturing apparatus 110 through the network. The program transmitted to the image capturing apparatus 110 is installed and executed in the image capturing apparatus 110.

The program installed and executed in the image capturing apparatus 110 operates the image capturing apparatus 110 to function as the moving image capturing control section 200, the still image capturing instruction reception section 201, a still image capturing control section 202, the image capturing section 210, a frame image generating section 220, the remaining battery level detecting section 294, the frame image identification information storage section 282, the frame image before/after image-capturing extracting section 284, the image storage control section 286, the mode setting section 288, the image memory 290, the amount of space detecting section 292 and the electric battery section 296 described with reference to FIG. 1-FIG. 8. Additionally, the program installed and executed in the image capturing apparatus 110 operates the frame image generating section 220 to function as the exposure time recording section 274, the composite ratio calculating section 276 and a frame image combining section 224 described with reference to FIG. 1-FIG. 5. Further, the program installed and executed in the image capturing apparatus 110 operates the frame image generating section 220 to function as the object extracting section 230, the change region specifying section 250, the image capturing time difference calculating section 260, the amount of change calculating section 240 and the frame image combining section 224 described with reference to FIG. 1, FIG. 3, FIG. 5 and FIG. 6-FIG. 8.

The above-described program may be stored in an external storage medium. The recording medium may be, in addition to the flexible disk 1590 and the CD-ROM 1595, an optical storage medium such as a DVD and a PD, a magneto-optical recording medium such as a MD, a tape medium and a semiconductor memory such as an IC card. Additionally, a storage medium such as a hard disk or a RAM which is provided in the server system connected to a private communication network or Internet is used as the recording medium to provide the program to the computer 1500 through the network.

While the present invention have been described with the embodiment, the technical scope of the invention not limited to the above described embodiment. It is apparent to persons skilled in the art that various alternations and improvements can be added to the above-described embodiment. It is apparent from the scope of the claims that the embodiment added such alternation or improvements can be included in the technical scope of the invention.

What is claimed is:

1. An image capturing apparatus comprising:
an image capturing section;
a moving image capturing control section for causing the image capturing section to capture a moving image including a plurality of frame images;
a still image capturing instruction reception section for receiving an instruction to capture a still image when the image capturing section continuously captures the plurality of frame images;
a still image capturing control section for causing the image capturing section to capture the still image at a timing after the capturing instruction reception section receives the instruction to capture the still image and before the image capturing section captures a frame image following the last frame image captured when the still image capturing instruction reception section receives the instruction to capture the still image;
a still image capturing timing recording section for recording a still image capturing timing at which the image capturing section captures the still image;
a frame image before/after image capturing extracting section for extracting the frame image captured before and the frame image captured after the still image capturing timing recorded by the still image capturing timing recording section from the plurality of frame images captured by the image capturing section; and
a frame image generating section for creating a frame image at the timing at which the image capturing section captures the still image based on the frame image captured before and the frame image captured after the still image capturing timing extracted by the frame image before/after image-capturing extracting section,
wherein the frame image generating section includes:
an exposure time recording section for recording a still image exposure time at which the image capturing section captures the still image;
a composite ratio calculating section for calculating a composite ratio between the still image captured by the image capturing section and at least one of the frame image captured before and the frame image captured after the still image capturing timing extracted by the frame image before/after image-capturing extracting section based on the still image exposure time recorded by the exposure time recording section; and
a frame image combining section for combining the still image captured by the image capturing section with at least one of the frame image captured before and the frame image captured after the still image capturing timing extracted by the frame image before/after image-capturing extracting section at the composite ratio calculated by the composite ratio calculating section to create a frame image at the timing at which the image capturing section captures the still image.

2. The image capturing apparatus according to claim 1, further comprising:
an image memory for storing the plurality of frame images captured by the image capturing section; and
a frame image identification information storage section for storing frame image identification information to identify each of the plurality of frame images stored in the image memory in association with information indicative of the timing at which each of the plurality of frame images stored in the image memory is captured, wherein
the frame image before/after image-capturing extracting section extracts frame image identification information on the frame image captured before and the frame image captured after the still image capturing timing recorded by the still image capturing timing recording section, and then extracts the frame image captured before and the frame image captured after the still image capturing timing from the image memory based on the extracted frame image identification information.

3. The image capturing apparatus according to claim 1, wherein
the still image capturing control section causes the image capturing section to capture the still image instead of one frame image among the plurality of frame images captured by the image capturing section when the still image capturing instruction reception section receives the instruction to capture the still image,
the still image capturing timing recording section records frame image identification information to identify the frame image which could not be captured because the image capturing section captures the still image as a still image capturing timing, the frame image before/after image-capturing extracting section extracts the frame image before and the frame image after respectively the frame image identified by the frame image identification information recorded in the still image capturing timing recording section.

4. The image capturing apparatus according to claim 1, further comprising a mode setting section for setting an image capturing mode in which the image capturing section captures a moving image or a still image and another setting mode, wherein,
   the frame image before/after image-capturing extracting section extracts the frame image before image-capturing and the frame image after image-capturing based on the still image capturing timing when the mode setting section does not select the image capturing mode, and
   the frame image generating section creates a frame image at the timing at which the image capturing section captures the still image based on the frame image captured before and the frame image captured after the still image capturing timing when the mode setting section does not select the image capturing mode.

5. The image capturing apparatus according to claim 1, further comprising:
   an electric battery section for supplying electric power to the image capturing section; and
   a remaining battery level detecting section for detecting whether the remaining battery level in the electric battery section is more than a predetermined reference value, wherein
   the frame image before/after image-capturing extracting section extracts the frame image captured before and the fume image captured after the still image capturing timing when the remaining battery level detecting section detects that the remaining battery level in the electric battery section is more than the predetermined reference value,
   the frame image generating section creates a frame image at the timing at which the image capturing section captures a still image based on the frame image before and the frame image after the still image capturing timing when the remaining battery level detecting section detects that the remaining battery level in the electric battery section is more than the predetermined reference value.

6. The image capturing apparatus according to claim 1, further comprising:
   an image memory for storing the moving image and the still image captured by the image capturing section, and the frame image generated by the frame image generating section; and
   an amount of space detecting section for detecting whether the amount of space in the image memory is more than a predetermined value, wherein
   the frame image before/after image-capturing extracting section extracts the frame image captured before and the frame image captured after the still image capturing timing when the amount of space detecting section detects that the amount of space in the image memory is more than the predetermined reference value, and
   the frame image generating section creates a frame image at the timing at which the image capturing section captures the still image based on the frame image captured before and the frame image captured after the still image capturing timing when the amount of space detecting section detects that the amount of space in the image memory is more than the predetermined reference value.

7. An image capturing method comprising:
   capturing a moving image including a plurality of frame images;
   receiving an instruction to capture a still image when the plurality of frame images are continuously captured;
   capturing the still image at a timing after the instruction to capture the still image is received and before a frame image following the last of the captured plurality of frame images is captured when the instruction to capture the still image is received;
   recording a still image capturing timing at which the still image is captured;
   extracting the frame image captured before and the fume image captured after the recorded still image capturing timing from the captured plurality of frame images; and
   creating a frame image at the timing at which the still image is captured based on the frame image captured before and the frame image captured after the still image capturing timing that are extracted in the frame image extracting step,
   wherein the fume image creating step includes:
      recording a still image exposure time at which the still image is captured;
      calculating a composite ratio between the captured still image captured and at least one of the frame image captured before and the frame image captured after the still image capturing timing that are extracted by the frame image extracting step, based on the recorded still image exposure time; and
      combining the captured still image captured with at least one of the frame image captured before and the frame image captured after the still image capturing timing that are extracted by the frame image extracting step, at the calculated composite ratio to create a frame image at the timing at which the still image is captured.

8. A program embodied on a non-transitory computer-readable medium comprising instructions which, when executed, causes an image capturing apparatus to perform the following:
   cause an image capturing section to capture a moving image including a plurality of frame images;
   receive an instruction to capture a still image when the image capturing section continuously captures the plurality of frame images;
   cause the image capturing section to capture the still image at the timing after the instruction to capture the still image is received and before the image capturing section captures a frame image following the last frame image captured when the still image capturing instruction reception section receives the instruction to capture the still image;
   record a still image capturing timing at which the image capturing section captures the still image;
   extract the frame image captured before and the frame image after the recorded still image capturing timing from the plurality of frame images captured by the image capturing section; and
   create a frame image at the timing at which the image capturing section captures the still image based on the extracted frame image captured before and the extracted frame image captured after the still image capturing timing,
   wherein, in order to create the frame image, the image capturing apparatus is further caused to perform the following:

record a still image exposure time at which the still image is captured;

calculate a composite ratio between the captured still image and at least one of the frame image captured before the still image capturing timing and the frame image captured after the still image capturing timing that have been extracted, based on the recorded still image exposure time; and combine the captured still image with at least one of the frame image captured before the still image capturing timing and the frame image captured after the still image capturing timing that have been extracted, at the calculated composite ratio to create a frame image at the timing at which the still image is captured.

* * * * *